United States Patent [19]

Osborne et al.

[11] 4,436,593

[45] Mar. 13, 1984

[54] SELF-ALIGNED POLE TIPS

[75] Inventors: John R. Osborne, Saratoga; Peter G. Bischoff, Cupertino, both of Calif.

[73] Assignee: Memorex Corporation, Santa Clara, Calif.

[21] Appl. No.: 282,540

[22] Filed: Jul. 13, 1981

[51] Int. Cl.$^3$ ............................................... G11B 5/42
[52] U.S. Cl. ........................................ 204/15; 29/603;
156/643; 156/653; 156/656; 156/657;
156/659.1; 204/192 E; 427/131; 427/132;
430/318
[58] Field of Search ................................ 427/127–132;
204/15, 32 R, 35 R, 38 B, 192 E; 156/643, 652,
653, 656, 657, 659.1; 29/603; 430/311, 313, 318,
319

[56] References Cited

U.S. PATENT DOCUMENTS

| | | | |
|---|---|---|---|
| 3,436,327 | 4/1969 | Shockley | 204/192 |
| 3,677,843 | 7/1972 | Reiss | 156/3 |
| 3,808,069 | 4/1974 | Caffrey | 156/11 |
| 3,814,641 | 6/1974 | Reinberg | 156/11 |
| 3,901,770 | 8/1975 | Littwin | 204/15 |
| 3,922,184 | 11/1975 | Baker et al. | 156/11 |
| 4,131,497 | 12/1978 | Feng et al. | 148/187 |
| 4,219,853 | 8/1980 | Albert et al. | 360/103 |
| 4,239,587 | 12/1980 | Koel et al. | 156/659.1 |
| 4,246,620 | 1/1981 | Kaminaka et al. | 360/127 |

OTHER PUBLICATIONS

W. D. Kehr et al., Magnetic Recording Head, *IBM Tech. Disc. Bulletin*, vol. 14, No. 7, Dec. 1971, pp. 2061–2062.

*Primary Examiner*—G. L. Kaplan
*Assistant Examiner*—William Leader
*Attorney, Agent, or Firm*—John J. McCormack; Nathan Cass; Kevin R. Peterson

[57] ABSTRACT

A method is disclosed for precisely aligning the pole tips of a thin film magnetic head. Two separate metallic layers, such as Permalloy (Ni-Fe alloy) are separated by a layer of insulating material such as silicon dioxide or $AL_2O_3$ which will serve as the insulative spacer of the final magnetic head. A photo-resist is applied to the surface of the top metallic layer in an imagewise configuration to establish the shape of the top pole. The top pole is then etched and the photo-resist removed. The top electrode is then encapsulated with a protective metal and is used as a mask during the chemical etching of the insulative layer, the bottom electrode being used as an etch stop. This integral structure is then used as a mask during the chemical etching of the bottom electrode, resulting in pole tips which are precisely aligned.

29 Claims, 5 Drawing Figures

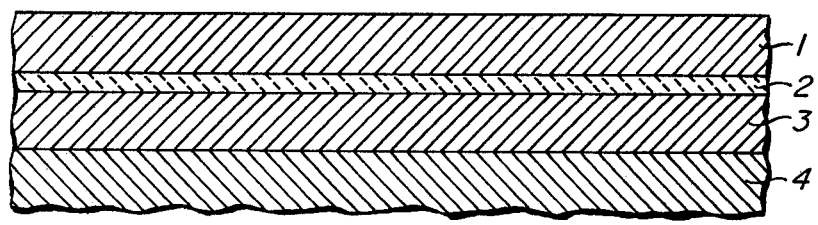
FIG._1.
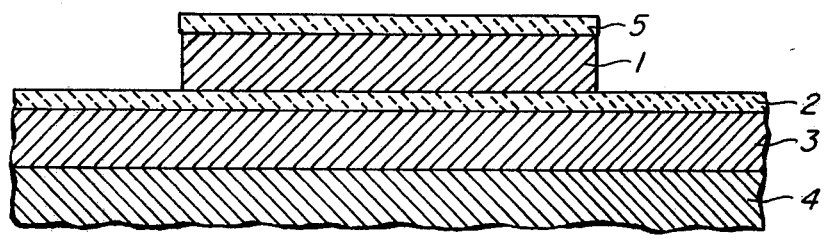
FIG._2.
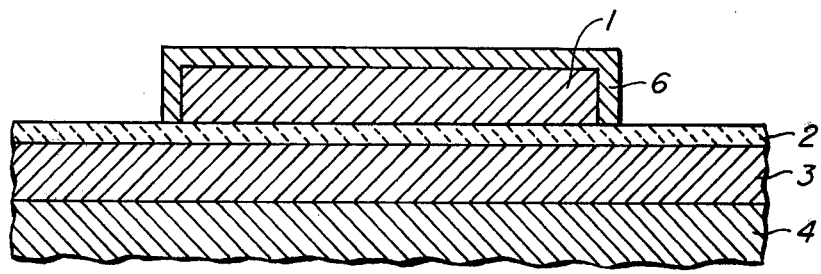
FIG._3.
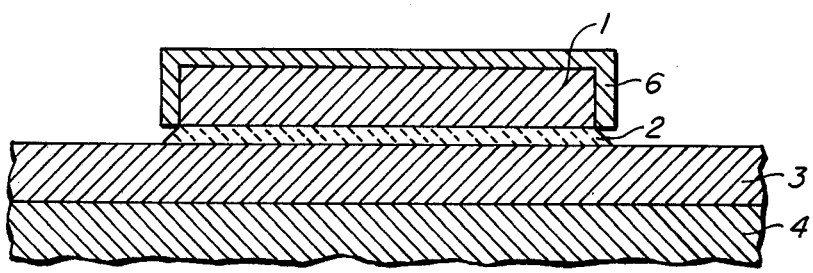
FIG._4.
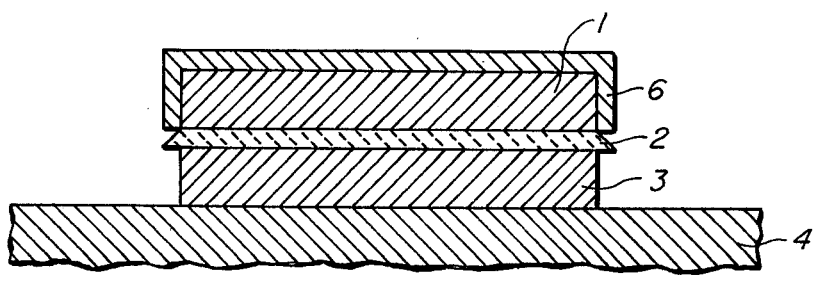
FIG._5.

SELF-ALIGNED POLE TIPS

BACKGROUND OF THE INVENTION

Thin film heads, by necessity, are high tolerance elements which are used to read/write information on various magnetic media, such as high-speed magnetic discs. Presently, the pole pieces of these magnetic heads, which are the elements used to interface with the magnetic media, have not been controlled so as to ensure uniform width and precise alignment of individual poles in any particular pole pair.

Although uneven poles have not presented a serious problem in the use of thin film heads with current magnetic media in currently marketed disc drive systems, future higher areal density applications will require much more stringent head dimensional tolerances. For example, in the not too distant future, magnetic recording disc systems having upwards of a thousand tracks per inch will be employed. Such systems will, in all likelihood, present a physical configuration wherein the track width of readable information will be only 0.8 mils or less. Uneven and/or improperly aligned poles will be unable to interface with the media in these systems without encountering cross-track noise in the read cycle and error-producing signals in the write cycle.

Due to the rather fine tolerances of the pole pieces, it has proven to be extremely difficult to produce pole pairs of substantially equal width and precise alignment relative to each other. It must be remembered that in currently marketed disc drive systems, the average magnetic head pole is only approximately 70–120 micro inches in thickness and approximately 0.9–1.4 mils in width. Prior to the present invention, attempts to produce poles of equal width and precise alignment have relied simply upon trial and error and random fabrication variables which certainly will not be acceptable as tolerances become more exacting with anticipated high density magnetic system applications.

It is thus an object of the present invention to produce pole tips for magnetic heads which are capable of satisfactorily operating with future high density magnetic media applications.

It is still another object of the present invention to provide a method for substantially completely aligning parallel pairs of pole tips for use in magnetic heads.

It is yet another object of the present invention to provide a relatively simple and convenient method of producing parallel pole tip pairs which are substantially of equal length for use in magnetic heads.

These and other objects of the present invention will be more fully appreciated when considering the present disclosure and appended drawings.

BRIEF DESCRIPTION OF THE INVENTION

The present invention comprises a method of aligning the pole tips of a thin film magnetic head. To an appropriate support is applied two magnetic metallic layers which are separated by an insulative layer. The magnetic layers are to be the final pole pieces (e.g., each typically about 40–140 micro inches thick) of the thin film magnetic head while the insulative layer will remain in the final configuration as a spacer. This spacer is commonly called the "Gap" region. The top electrode can be formed by several techniques. For example, photo-resist is first applied to the top surface of the uppermost magnetic layer. It is exposed in imagewise configuration in the size and shape of the eventual pole pieces and the unexposed areas washed away to provide a selective mask. The top magnetic layer is then etched using a suitable etchant such as 30% (by Vol.) Ferric Chloride ($FeCl_3.6H_2O$) in Ethylene Glycol at $55\pm1°$ C. and the photoresist then removed.

The top electrode could also be formed by ion milling or by pattern electroplating as described in U.S. Pat. No. 3,853,715. In either case, a current carrying bus should be electrically connected to the electrode during formation thereof.

Once the top pole is formed, as described above, it is encapsulated in a protective metal and used as a mask to etch the insulative layer. This protective metal is not capable of being etched with etchants used for etching the bottom electrode or the insulative layer. The insulative layer and top magnetic layer with the protective metal encapsulation is then used to mask the bottom metallic layer forming the bottom pole. Preferably, the metallic layers are comprised of Permalloy (Ni-Fe alloy) while the insulative layer is $SiO_2$ or $Al_2O_3$.

FIGS. 1–5 represent sequential cross-sectional views of the process of the present invention.

DETAILS OF THE INVENTION

Referring now to the appended drawings, base 4 is used as a support for the depicted three-layer structure. Applied to support 4 is bottom metallic layer 3, insulative spacer layer 2 and top metallic layer 1. Referring to FIG. 2, photo-resist 5 is applied to the top surface of upper magnetic layer 1 and is retained in imagewise configuration to define the shape of the top electrode. If the top electrode is a nickel-iron alloy, it can be etched (e.g. spray etched) by a solution of $FeCl_3$ in ethylene glycol. Such an etchant will not attack photo-resist 5 while the insulative layer 2 will act as an etch stop, protecting the integrity of bottom metallic layer 3.

Photo-resist layer 5 is then removed and the top electrode 1 is encapsulated in a protective metal. The protective metal must be a material which encapsulates top electrode 1 and isolates it from later used etchant solutions for bottom metal layer 3. In that metallic layers 1 and 3 are chosen of the same material, top electrode 1, must be fully encapsulated and thus isolated from later used etchant solutions.

It has been found that among the possible protective metals, silver, gold, and rhodium are most likely candidates. They all can provide a suitable protective barrier during later etchant operations. Of the three preferred protective metals, rhodium is the most preferred. It has been found that silver is the least protective metal because of its chemical reactivity and propensity towards long term oxidation and corrosion if left in the structure. Gold, being a noble metal, will not oxidize but is relatively soft and thus will wear during contact between the pole tips and the magnetic surface if left in the structure. Rhodium, on the other hand, is sufficiently hard and impervious to oxidation as to be the most preferred protective metal. If, however, the protective metal is removed after the fabrication of the poles, rhodium would offer no substantial advantage over the remaining disclosed materials.

Although the protective metal can be applied by any means known to one of ordinary skill in the art, it has been found that it can be most advantageously applied by electrolytic means. More specifically, a bus bar is connected to top electrode 1 and an electrolytic solution of the appropriate protective metal is electrolytically adhered to the top electrode.

Standard commercially available plating solutions, available from companies such as Lea-Ronal, Inc. and Sel-Rex, are suitable in carrying out electroplating operations in the deposition of protective layer 6.

Referring to FIG. 4, once top electrode 1 has been configured and encapsulated in protective metal 6, insulative layer 2 is etched. Preferably, insulative layer 2 is $SiO_2$ and is etched with a buffered HF solution of 4 parts $NH_4F + 1$ part Hf.

If vacuum deposited $Al_2O_3$ is employed as the insulative material, it can be removed (1) by ion milling, in which case protective metal 6 must be made of sufficient thickness to compensate for loss of material during milling; (2) by chemically etching in a mixture of, for example, 10 parts nitric acid, 15 parts hydrofluoric acid and 300 parts water. Vacuum deposited $Al_2O_3$ can also be etched in 2:1 or 1:1 phosphoric acid:DI water mixture at 60°–80° C. Note the sloping walls of the insulative layer which represents some degree of undercutting if chemically etched, although the overall width of the insulative layer is substantially equal to the width of top electrode 1.

It is important, however, that the undercut does not extend beyond the protective overcoat layer to prevent attack of the top pole during subsequent bottom pole etching.

As a final process step of this invention, bottom electrode 3 is now configured.

Referring to FIG. 5, top electrode 1 coated with protective metal 6 and insulative layer 2 are both used as a mask for configuring bottom electrode 3. As with the top electrode, if Permalloy is used as the metallic layer, a solution of $FeCl_3$ in ethylene glycol can be used as the etchant. It is important that neither the top electrode 1 nor the protective metal 6 make electrical contact with the bottom electrode 3 elsewhere in the circuit in order to prevent the formation of an electrochemical Galvanic couple which would result in severe undercutting of the bottom electrode 3 during etching. If this couple is not allowed to form, undercutting of the bottom electrode is minimal. For example, in a 120 micro inch thickness of Ni-Fe alloy, the undercut should be no more than 60 to 80 micro inches. Thus, the pole pieces of a thin film magnetic head have been configured such that they are substantially completely aligned.

As stated previously, protective metal layer 6 can be retained on top pole 1. The reason for this is simply that the protective metal layer would not substantially interfere with the operation of the magnetic head and its removal can, at times, be quite difficult. However, the bus bar should be removed in later process operations.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of precisely aligning the pole tips of a thin film magnetic head comprising:
 a. applying to a support, two metallic layers separated by an insulative layer, these all being superposed on one another, said metallic layers to become the pole tips of the magnetic head; a "first" one of said metallic layers being applied to said support; the insulative layer being then applied over said "first" metallic layer, and a "second" metallic layer being then applied on said insulative layer;
 b. applying a photo-resist to the surface of said "second", or "top" metallic layer in imagewise configuration to establish the shape of the top pole;
 c. etching the top metallic layer to the insulative layer in areas not protected by the photo-resist thus forming the top pole;
 d. removing the photo-resist and encapsulating the top pole with a protective metal;
 e. etching the insulative layer using the top pole as a mask; and
 f. etching the "first", or "bottom" metallic layer using the top pole and insulative layer as a mask to form the bottom pole.

2. The method of claim 1 wherein the metallic layers are comprised of Ni-Fe alloy.

3. The method of claim 2 wherein the metallic layers are etched by spray etching with a solution of $FeCl_3$ in ethylene glycol.

4. The method of claim 1 wherein the insulative layer is $SiO_2$ or $Al_2O_3$.

5. The method of claim 4 wherein the $SiO_2$ layer is etched with a buffered HF solution.

6. The method of claim 4 wherein the $Al_2O_3$ is etched in a mixture of nitric, HF, and water.

7. The method of claim 1 wherein the protective metal comprises a metal selected from the group consisting of silver, gold and rhodium.

8. The method of claim 7 wherein the protective metal is applied to the top electrode by electroplating the protective metal through a bus bar.

9. The method of claim 1 wherein the protective metal is rhodium.

10. The method of claim 1 wherein the protective metal is removed after formation of the bottom pole.

11. The method of claim 1 wherein the poles are approximate 40–140 micro inches in thickness.

12. The method of claim 1 wherein the insulative layer is removed by ion milling.

13. In a method for fabricating a thin film magnetic head, wherein the pole tips are very precisely aligned, the steps of:
 applying a first magnetic layer to base means;
 applying a non-magnetic spacer layer on this first magnetic layer;
 applying a second magnetic layer on this spacer layer;
 applying photo-resist atop the second magnetic layer, such as to outline it for etching into a prescribed top-pole configuration;
 etching said second magnetic layer to form a configured "top-pole" and removing said photo-resist;
 encapsulating the so-generated "top-pole" against a prescribed later etching of said spacer and first magnetic layers by covering it with a prescribed coating of protective metal;
 etching away all portions of said spacer layer not so-masked by said so-encapsulated "top-pole" structure, and likewise etching away all portions of said first magnetic layer not masked by the top-pole and the spacer layer to leave a "bottom pole" structure very precisely aligned with the so-superposed "top-pole".

14. The method of claim 13 wherein the magnetic layers are comprised of Ni-Fe alloy.

15. The method of claim 14 wherein the magnetic layers are etched chemically by spray etching with a solution of FeCl$_3$ in ethylene glycol.

16. The method of claim 13 wherein the insulative layer is SiO$_2$ or Al$_2$O$_3$.

17. The method of claim 16 wherein the SiO$_2$ layer is etched with a buffered HF solution.

18. The method of claim 16 wherein the Al$_2$O$_3$ is etched in a mixture of nitric, HF, and water.

19. The method of claim 13 wherein the protective metal comprises a metal selected from the group consisting of silver, gold and rhodium.

20. The method of claim 19 wherein the protective metal is rhodium.

21. The method of claim 19 wherein the encapsulation of the "top-pole" is effected by electroplating the protective metal thereon through a bus bar.

22. The method of claim 13 wherein the protective metal is removed after formation of the bottom pole.

23. The method of claim 13 wherein the poles are approximate 40-140 micro inches in thickness.

24. The method of claim 13 wherein the insulative layer is removed by ion milling.

25. The method of claim 13 wherein the magnetic layers are comprised of Ni-Fe alloy and wherein the insulative layer is SiO$_2$ or Al$_2$O$_3$.

26. The method of claim 25 wherein the protective metal comprises a metal selected from the group consisting of silver, gold and rhodium.

27. The method of claim 26 wherein the protective metal is rhodium.

28. The method of claim 27 wherein the poles are approximate 40-140 micro inches in thickness.

29. The method of claim 28 wherein the SiO$_2$ layer is etched with a buffered HF solution, and wherein the Al$_2$O$_3$ is etched in a mixture of nitric, HF, and water.

* * * * *